Figure 1:
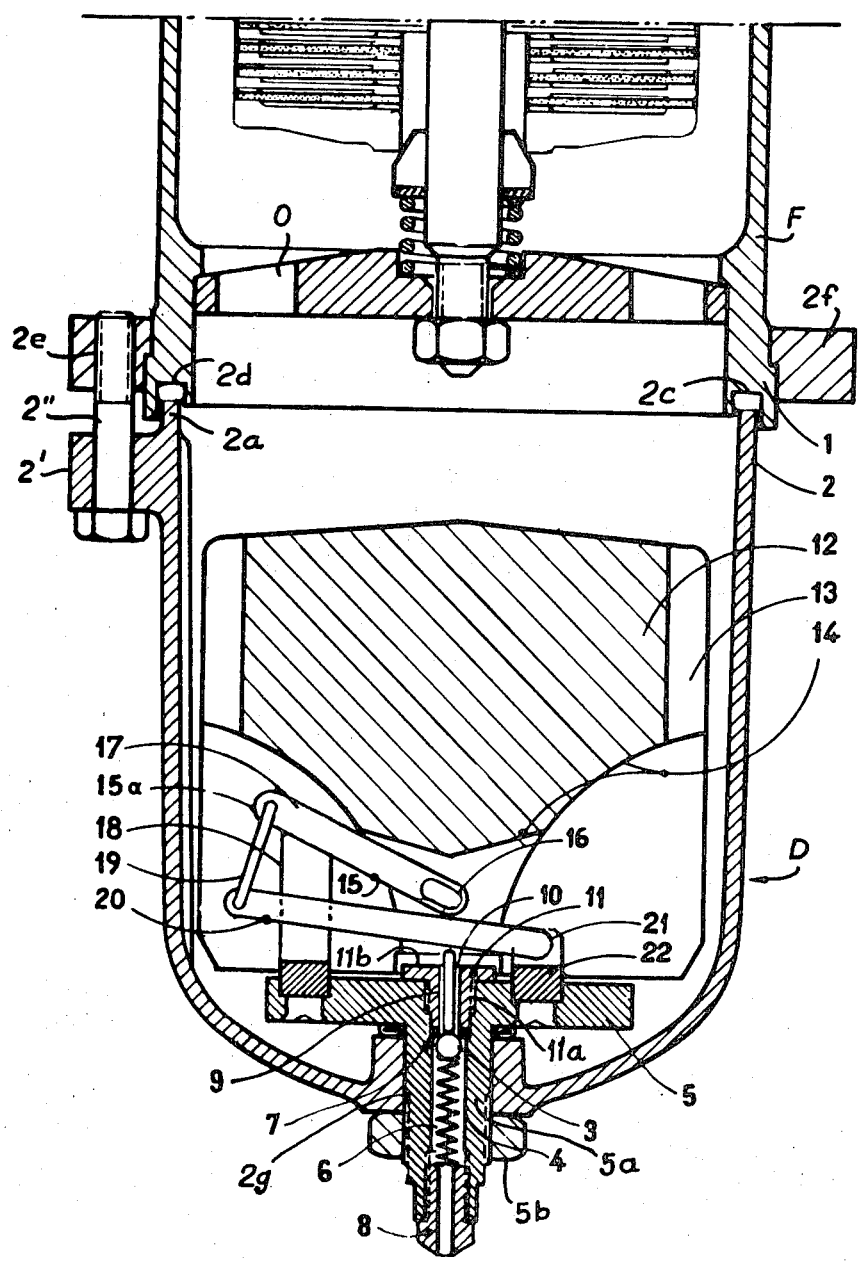

United States Patent
Muller

[15] 3,685,655
[45] Aug. 22, 1972

[54] AUTOMATIC WATER DRAINING DEVICE FOR FUEL FILTER

[72] Inventor: Jacques Muller, 123 Ave. du Genl. de Gaulle, La Garenne-Colombes, France

[22] Filed: Nov. 13, 1970

[21] Appl. No.: 89,261

[30] Foreign Application Priority Data

July 3, 1970 France............................7024688

[52] U.S. Cl..................................210/114, 210/119
[51] Int. Cl.................................................B01d 35/16
[58] Field of Search....................210/112–115, 117, 210/119; 55/165, 166, 169, 172, 173, 174

[56] References Cited

UNITED STATES PATENTS

| R19,227 | 6/1934 | Samiaan....................210/114 |
| 2,204,998 | 6/1940 | Ryan et al..............210/112 X |
| 2,413,430 | 12/1946 | Boone.......................210/114 |
| 2,766,890 | 10/1956 | Kasten...................210/114 X |
| 2,070,395 | 2/1937 | Easter.......................210/117 |
| 1,183,513 | 5/1916 | Ahola......................55/169 X |
| 1,515,865 | 11/1924 | Long........................55/169 X |

FOREIGN PATENTS OR APPLICATIONS 20,020 11/1935 Australia....................55/166

*Primary Examiner*—John Adee
*Attorney*—Arthur B. Colvin

[57] ABSTRACT

An automatic draining device for a fuel filter which comprises a receptacle to receive the water discharged by the filter, the receptacle having a discharge outlet with a normally closed valve, the opening of which is connected by a lost motion linkage to a float positioned in the receptacle which will rise as water accumulates in the receptacle and which will open the valve controlling the discharge outlet only when the water level has reached a predetermined amount.

2 Claims, 3 Drawing Figures

AUTOMATIC WATER DRAINING DEVICE FOR FUEL FILTER

As conducive to an understanding of the invention, it is noted that fuels used in the operation of internal combustion engines, for example, contain molecules of water in suspension which are detrimental to the efficient performance of the engine and it is necessary to filter such fuels and to eliminate such water.

The water, when filtered, normally falls to the bottom of the filter and it is necessary to eliminate or to evacuate such water when it has accumulated beyond a predetermined amount in order to prevent reintegration of the water with the fuel which would interfere with the operation of the engine.

Where manual means are provided to eliminate the water that has been collected, it is necessary for the operator to constantly supervise the operation of the filter to make sure that the accumulated water is discharged before it reaches an excessive amount. In addition to this need for supervision, normally the engine must be stopped in order that the water in the filter can be discharged, which stoppage is undesirable.

Where automatic means are provided to control a valve which will be opened to discharge the water when an excessive amount has accumulated and the valve is subject to the vibration of the engine, continuous leakage may occur as the valve oscillates on its seat.

It is among the objects of the invention to provide an automatic water discharge device for a filter which is relatively simple in construction, having few parts that may be fabricated at low cost and which is dependable in operation and will automatically discharge the water drained by the filter when an excessive amount of water has accumulated, which discharge device incorporates a valve which is not physically connected to the linkage for opening the valve until the water level has reached an excessive amount, thereby rendering the valve insensitive to vibration of the engine which normally is transmitted to the valve.

According to the invention, these objects are accomplished by the arrangement and combination of elements hereinafter described and more particularly recited in the claims.

Figure 2:
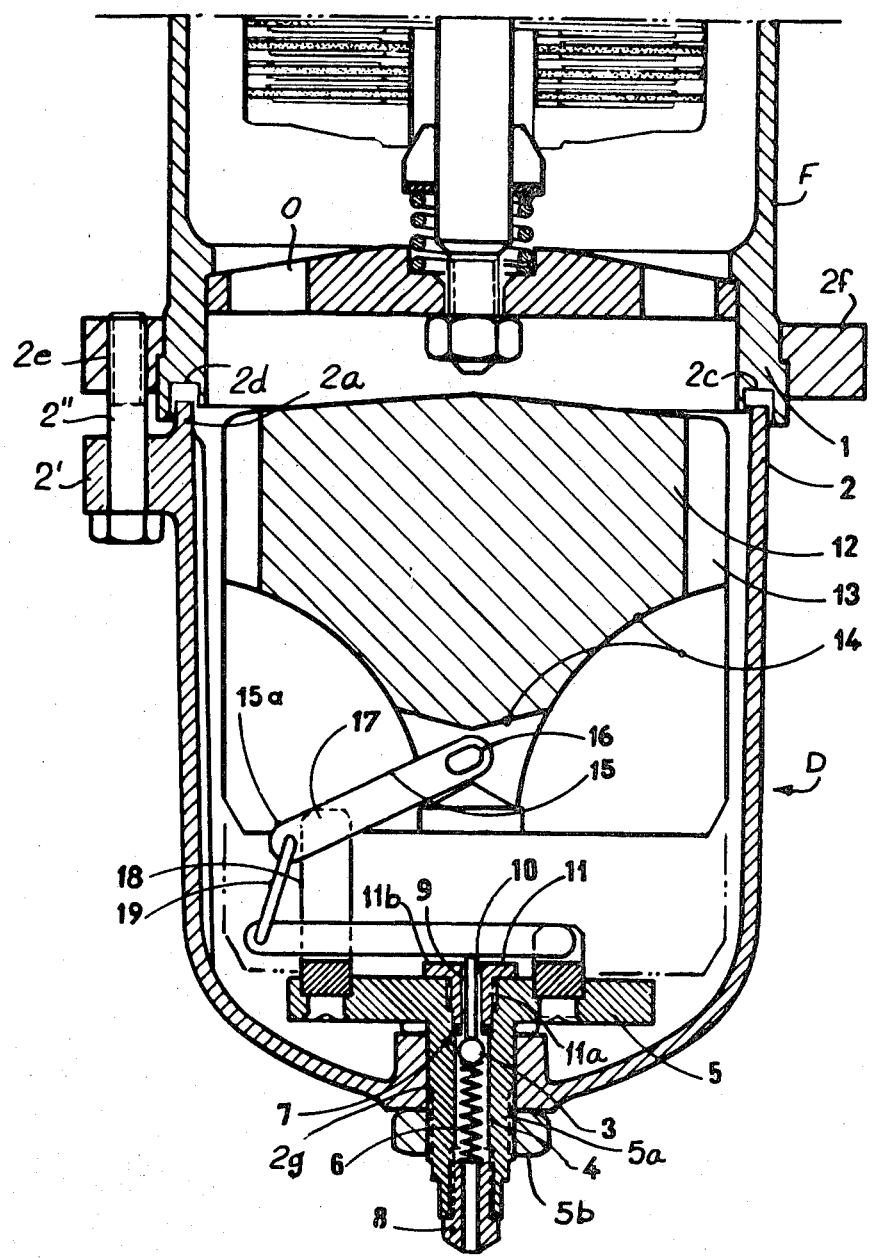
Figure 3:
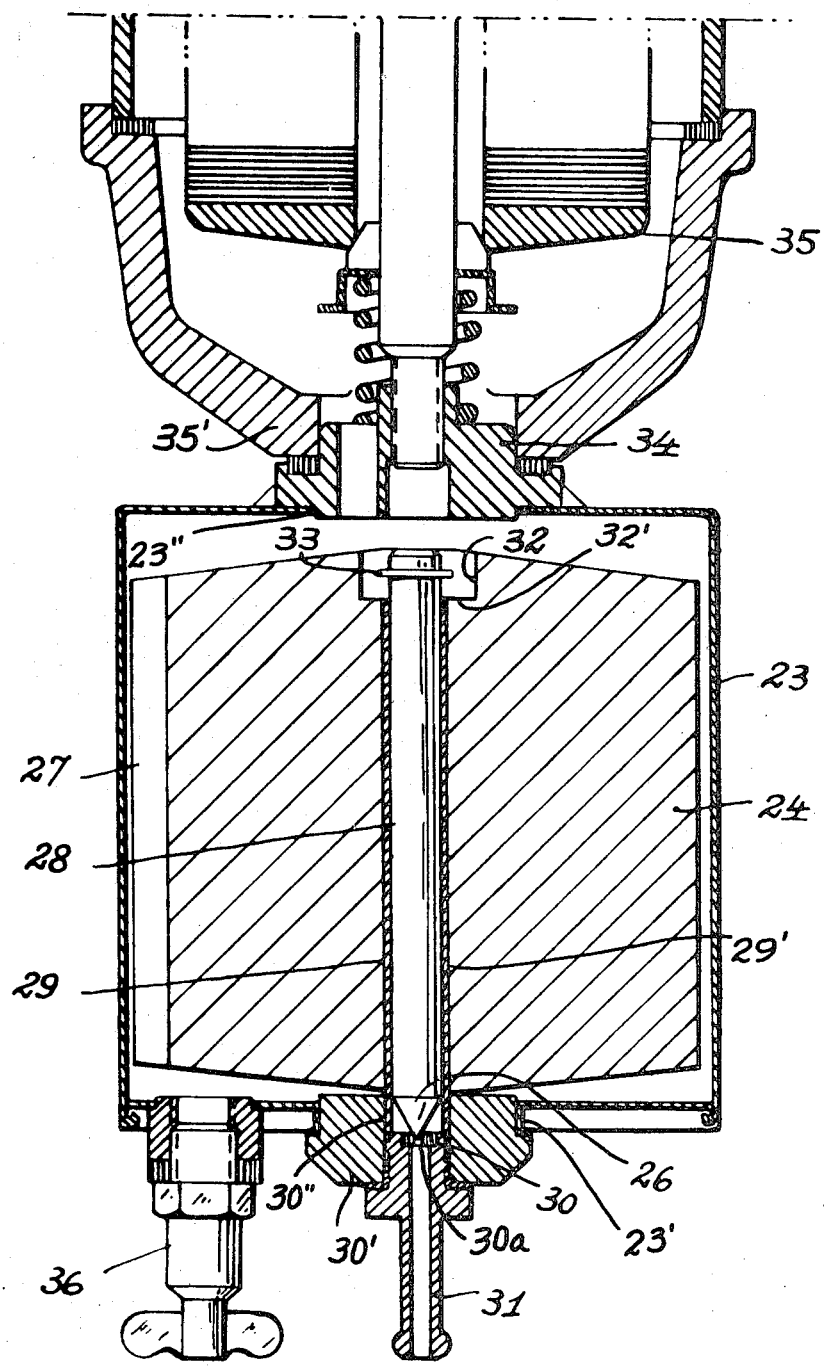

In the accompanying drawings in which are shown one or more of various possible embodiments of the several features of the invention, FIG. 1 is a longitudinal sectional view of an oil filter with an automatic water discharge device according to one embodiment of the invention showing the discharge valve in closed position, FIG. 2 is similar to FIG. 1 but showing the discharge valve in open position, and FIG. 3 is a longitudinal sectional view of another embodiment of the invention.

Referring now to the drawing, in the embodiment shown in FIGS. 1 and 2, a filter F is provided which may be of any conventional type.

The automatic discharge unit D is secured to the lower end of the filter F and is in communication therewith. More particularly, the discharge unit D comprises a receptacle 2 having a body portion which is substantially cylindrical and which has outwardly extending ears 2' adjacent its mouth 2a.

The lower end 1 of the filter F has an annular groove 2c which receives the upper end or mouth 2a of the receptacle 2. A gasket 2d is positioned in said groove so that when suitable bolts 2'' extending through ears 2' into threaded openings 2e in a collar 2f associated with the filter F are tightened, the receptacle 2 will be releasably locked to the filter F in liquid tight relation thereto.

The lower end of the receptacle 2 has an axial bore 2g through which extends a hollow stem 5a, the latter having a support disc 5 at its inner end through which bore 4 of the stem also extends.

The outer end of the stem 5a protrudes beyond the end of bore 2g and is externally threaded to receive a nut 5b to lock the stem and support disc in fixed position.

A portion of bore 4 extending axially through disc 5 is internally threaded and receives the correspondingly threaded stem 11a of a fitting 11, the head 11b of which is seated on the inner surface of support disc 5.

The fitting 11 has an axial bore 10 therethrough axially aligned with bore 4 and of smaller diameter, the inner end of bore 10 defining a seat 7 including a resilient gasket for a ball valve 3.

The ball valve 3 is normally urged against seat 7 to close bore 10 by a coil spring 6, one end of which reacts against ball valve 3 and the other end of which reacts against the inner end of a nipple 8 screwed into the internally threaded outer end of bore 4. Thus, the force exerted by spring 6 to retain ball valve 3 on its seat 7 may be adjusted by rotation of nipple 8.

In order to move ball valve 3 off its seat to open bore 10, a pin 9 is provided of smaller diameter than bore 10 and of greater length than the length of the bore so that when the outer end of the pin 9 abuts against ball valve 3, the inner end of the pin will protrude beyond the head 11b of fitting 11.

In order to actuate the pin 9 to move the ball 3 off its seat 7, a float 12 is provided positioned in the cylindrical receptacle above the support disc 5. The float 12, which illustratively is of polypropylene, has a plurality of grooves 13 in its cylindrical outer surface extending parallel to the axis of the float for ready flow of liquid. In addition, the bottom of the float has appropriate recesses 14 to accommodate the linkages now to be described.

Referring to FIG. 1, a post 18 rises from the disc 5 adjacent its periphery and is diametrically aligned with a shorter post 22 also rising from disc 5 but at a closer distance from the axis of disc 5 than post 18.

Each of the posts 18 and 22 is defined by an upstanding U-shaped bracket. A pitman or link 15 is pivotally connected as at 17 to the upper ends of the legs of post 18, so that a portion 15a of link 15 will extend beyond pivot 17. The other end of link 15 is pivotally connected to a pin 16 secured to the bottom end of the float. The outer end of protruding portion 15a is pivotally connected by a link 19 to one end of a pitman or link 20, the other end of which is pivotally connected as at 21 to the upper ends of the legs of post 22.

With the float 12 in its lowermost position shown in FIG. 1, the lower edge of link 20 which is aligned with pin 9 will be vertically spaced from the inner end of said pin so that no force will be exerted by the pin 9 to move ball valve 3 off its seat 7 on which it is retained by spring 6.

It is to be noted that due to the linkage arrangement above described, a slight upward movement of the float will cause a multiplication of the forces exerted against the pin 9 by link 20.

During normal operation of the filter, the water will discharge through openings O into the receptacle 2 which will start to fill. Initially, the ball valve 3 will be retained on its seat 7 by the adjustable force exerted by coil spring 6.

As soon as the water accumulated in receptacle 2 has reached a critical level the rising action of the float will cause the link 15 through link 19 to pivot link 20 downwardly until it engages pin 9 as shown in FIG. 2, causing the latter to move downwardly. As a result, the ball valve 3 will be moved away from its seat 7 to open passageway or bore 10 so that the water collected in receptacle 2 may discharge through nipple 8.

The float will follow the descending level of water in receptacle 2 permitting the spring 6 to reseat ball valve 3 when the link 20 has moved away from pin 9.

The device above described is relatively insensitive to vibration as the float is not positively connected to the valve.

In addition, the float is preferably made so that it will float only on water and not in the fuel being filtered which is a hydrocarbon. To this end, the float is of polypropylene whose density is 0.9, which is less than that of water, which has a density of 1 but greater than that of hydrocarbon which have a density of 0.89.

In the embodiment shown in FIG. 3, the filter 35 which also may be of any conventional type, has its outlet end 35' connected by a fitting 34 to a port at the upper end of a receptacle 23 which illustratively is cylindrical in cross section. The receptacle has a port 23' at its lower end axially aligned with the inlet port 23'' to the receptacle, the port 23' having a fitting 30' secured therein which has an axial bore therethrough. The lower end of the receptacle 23 has a manually operated drain outlet 36 to discharge the receptacle when required.

Extending axially in the receptacle is a guide sleeve 29, the lower end of which is secured in the axial bore 30'' in the fitting 30'. Slidably mounted on the guide sleeve is a float 24 of suitable density and preferably of polypropylene so that it may readily float in water but not in hydrocarbon. The float has a plurality of grooves 27 in its side wall extending parallel to the axis of the receptacle, and the bore 29' of the float through which the guide sleeve 29 extends, is of enlarged diameter at its upper end as at 32 to define a cavity. Secured in the internally threaded end of the fitting 30' is a nipple 31 which has a bore therethrough axially aligned with the bore 29' of the guide sleeve. The inner end of the nipple mounts a transverse disc 30 which has a central opening 30a therein which defines a valve seat. Slidably mounted in the sleeve 29 is a rod 28, the lower end 26 of which is conical to define a valve member, which when the rod 28 is in its lowermost position shown, will move against the seat defined by the central opening 30a to close said opening. At such time the end of the rod remote from the conical valve head portion 26 thereof will protrude into the cavity 32 and a collar or clip 33 is secured to such protruding end to permit slight actual movement of the float without corresponding movement being imparted to the rod 28.

With the arrangement shown in FIG. 3, as the liquid enters the receptacle 23, the float 24 will start to rise. No movement will be imparted to the rod 28 until the float has lifted sufficiently so that the floor 32' of the cavity abuts against the collar 33 at which time the rod 28 will also be lifted, to move the valve head 26 thereof away from the seat 30a so that water in the receptacle may drain therefrom through the opening 30a and the bore of nipple 31.

With the devices above shown, it is apparent that since the floats are not positively connected to the valves, vibration or shock imparted to the floats when the associated valve member is in closed position will have no effect on the valve member. As a result, vibration of the engine with which the filter and automatic draining device is associated during normal operation of the engine will have no effect on the valve so that there will not be continuous leakage therefrom and drainage will only occur when an excessive quantity of water has been collected.

Having thus described my invention, what I claim as new and desire to secure by Letters Patent of the United States is:

1. An automatic water discharge device for a fuel filter having an outlet, comprising a receptacle having an inlet in communication with said outlet, said receptacle having a discharge outlet comprising a fitting having an axial bore therethrough of reduced diameter at its inner end defining a valve seat, a ball valve positioned in the larger diameter portion of said bore, a coil spring in said larger diameter portion of said bore reacting against said ball valve normally to retain the latter against said seat, a pin extending through the smaller diameter portion of said bore having one end abutting against said ball valve and its other end protruding from said reduced diameter portion of said bore into said receptacle, a float member substantially cylindrical in cross section in said receptacle movable axially with respect thereto and axially aligned with said discharge outlet, and a linkage including a lost motion connection between said valve member and said float operatively to connect said float to said valve member for movement of the latter to open said discharge outlet only after the float has moved axially a predetermined distance, said linkage comprising a link pivotally mounted at one end in said receptacle on one side of said pin and extending over the latter to the other side of said pin, a second link pivotally mounted at one end to said float at a point vertically aligned with the axis thereof and vertically aligned with said pin, said link extending in the same direction as said first link toward the other side thereof, means pivotally connecting said second link in said receptacle at a point on said second link spaced inwardly from the free end thereof and means pivotally connecting the free ends of both of said links, said first link when the float is in its lowermost position having its lower edge vertically spaced from the protruding end of said pin whereby upon upward movement of said float, said lower edge of said first link will move an appreciable distance before connecting said protruding end of said pin to displace the latter to effect movement of said ball off its seat.

2. The combination set forth in claim 1 in which means are provided to adjust the tension of said coil spring.